UNITED STATES PATENT OFFICE.

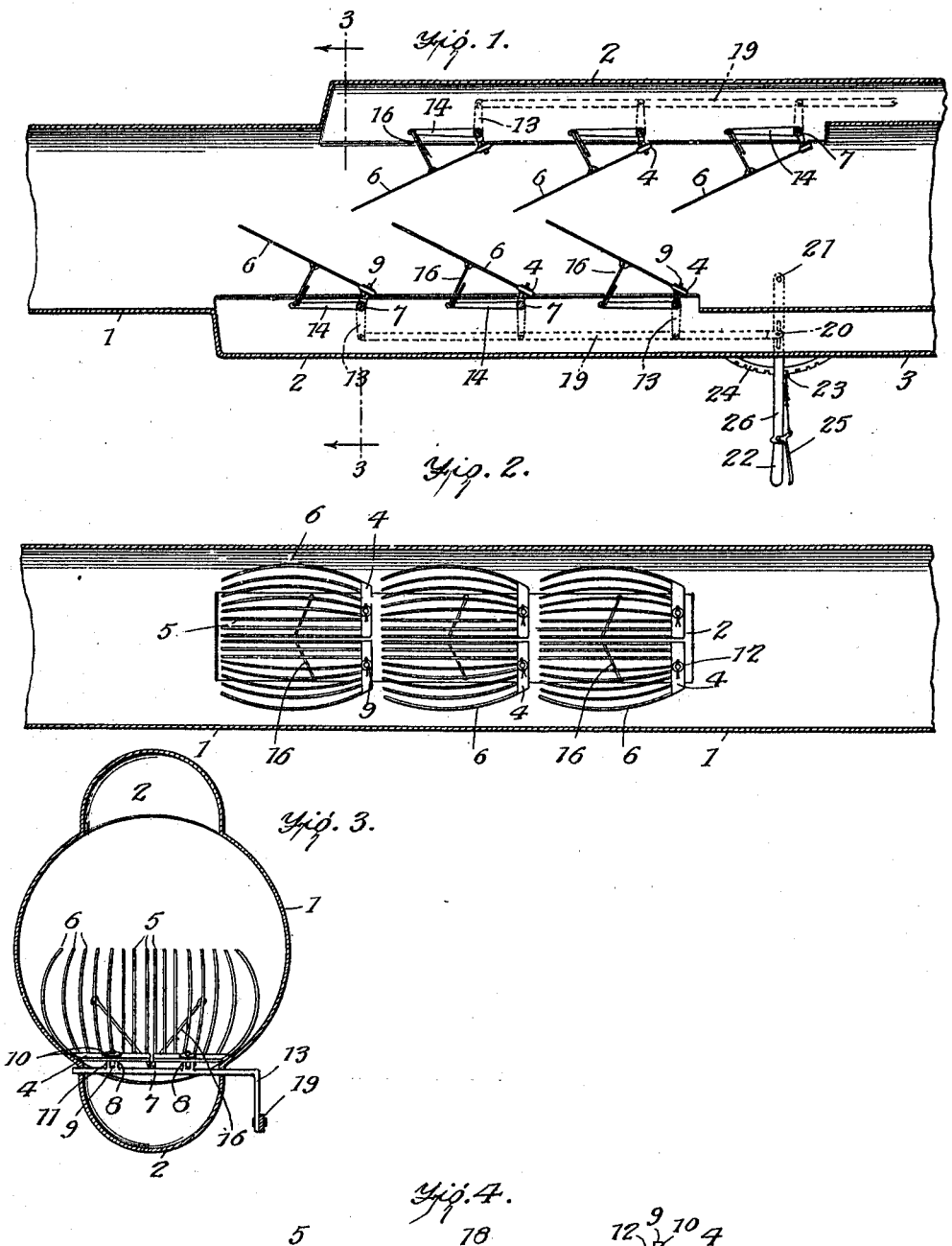

ERICK P. BERGMAN, OF CHEROKEE, OKLAHOMA.

GRAIN-SEPARATOR.

993,141.	Specification of Letters Patent.	Patented May 23, 1911.

Application filed December 22, 1910. Serial No. 598,750.

*To all whom it may concern:*

Be it known that I, ERICK P. BERGMAN, a citizen of the United States, and a resident of Cherokee, county of Alfalfa, and State of Oklahoma, have invented certain new and useful Improvements in Grain - Separators, of which the following is a specification.

My invention is an improvement in grain separators, and consists in certain novel constructions, and combinations of parts, hereinafter described and claimed.

The object of the invention is to provide a mechanism for use with separators using wind stackers, adapted to be arranged within the stacker for separating any grain that may remain from the straw, before the straw is delivered to the stack.

Referring to the drawings forming a part hereof, Figure 1 is a longitudinal vertical section of a portion of a stacker with the improvement in place. Fig. 2 is a horizontal longitudinal section. Fig. 3 is a transverse vertical section, and, Fig. 4 is an enlarged side view of one of the separating devices.

The present embodiment of the invention is shown in connection with the stack 1 of a thresher or separator of any usual or desired construction. The stack is in the form of a tube, and the straw is forced through the tube by means of a fan delivering a blast of air through the tube.

More or less grain remains with the straw, and without the improvement, such grain falls on the stack and is lost. The improvement is designed to recover this grain, and the tube 1 is provided at its lower side with a recess 2, formed integral with the tube.

The recess is substantially semi-circular in cross section, and a pipe or chute 3 leads from the lower end of the recess, and delivers to the elevator of the separator, so that the grain may be cleaned and passed out of the machine. The separating device comprises a plurality of screens arranged transversely of the recess, and between the same and the tube. The screens are alike, and but one will be described.

Each screen is composed of a plurality of sections, and each section comprises a cross bar 4, provided with a plurality of laterally extending fingers 5 and 6. The inner fingers 5 of each section are straight, as shown in Figs. 2 and 3, while the outer fingers 6 are curved longitudinally.

The fingers 6 of each section are arranged with their curve outward, and the radius of the curve decreases toward the outermost fingers, as shown more clearly in Fig. 3. The sections of each screen are symmetrical and the sections are arranged with the cross bars in alinement. Thus the screens fit the tube roughly, the fingers of each screen having the greatest curve being adjacent to the tube wall.

A shaft 7 is journaled transversely of the recess below each screen, and the ends of each shaft extend through the walls of the recess. Each shaft is arranged below the alined cross bars of the screen to which it belongs, and is provided with a pair of spaced transversely perforated lugs 8 at approximately the center of each cross bar.

An eye bolt 9 is passed transversely through each cross bar, and is held in place by a pin 10, passing through the bolt. A washer 12 is arranged between each pin and the cross bar, and each shaft 7 is provided at one end, outside of the recess, with a crank arm 13. The eye of each bolt is received between the adjacent lugs 8 of the shaft, and a bolt 11 passes through the eye and lugs, to pivot the sections to the shaft.

Each shaft is provided with a forwardly extending arm 14 at approximately its center, and the free end of the arm is slotted at 15. A link 16 connects each section of the adjacent screen with the arm 14. Each link is provided with an eye 17 at each end, one of which engages an eye 18 on one of the inner fingers of the section, while the other eye engages the slot 15 of the arm.

A bar 19 connects the arms 13 of all of the shafts, and the bar is extended beyond the shafts at one end, and pivoted to a lever 25 at 20, intermediate the ends of the lever. One end of the lever is pivoted at 21 on the tube, and the other end is provided with a handle 22. A tooth 23 on the lever coöperates with a toothed sector or bar 24 on the tube, to hold the lever in adjusted position, and the tooth is operated by a grip 26.

By means of the lever the inclination of the screens with respect to the longitudinal axis of the tube may be varied simultaneously, and all may be held in adjusted position. The aggregate length of the screens is substantially equal to the length of the recess, so that the recess is separated from the tube by the screens.

In operation, the straw as it is thrown out through the tube, strikes the fingers of the screens, and in moving over the screens, from one screen to the other, the said straw is agitated and shaken to beat out the last grains. The said grains fall between the fingers into the recess, and gravity carries them through the pipe 3 into the body of the separator.

The bar 19 is pivoted in a slot in the lever 25, to permit motion between the parts.

A considerable quantity of loose or separated grain passes out with the straw, and this grain moves along the bottom of the tube on account of its weight. When such grain reaches the recess, it passes through the screens and is returned with that already mentioned. The elevator lifts the said grain and passes it through the cleaning devices, thus recovering a considerable quantity that would be otherwise lost.

It will be evident that many changes might be made in the construction of the screens, and in their arrangement without departing from the spirit of the invention as pointed out in the appended claims.

If desired, screens similar to those shown in Fig. 3 may be placed at the top of the tube, the said screens inclining downward and forward and the said screens may be adjusted in the same manner as shown below. This construction is indicated in Fig. 1. The stacker may be also arranged to telescope if desired.

I claim:

1. In a grain separator, the combination with the stacking tube, provided with a recess in its under side extending longitudinally of the tube, a pipe leading from the lower end of the tube to the separator, a plurality of screens arranged transversely of the recess, one behind the other and separating the recess from the tube, each screen consisting of a plurality of sections, each section comprising a cross bar and a plurality of laterally extending fingers, the cross bars of the sections forming a screen being arranged in alinement transversely of the tube, the outermost fingers of each section being curved outwardly, a shaft journaled transversely of the recess below each pair of alined cross bars, an eyebolt connected with each cross bar, a pivotal connection between the eye of each eyebolt and the shaft, each of the said shafts having a central arm extending between the sections and having a crank arm outside of the tube, a link connecting each section with the central arm of the adjacent shaft, a bar connecting the arms, a lever pivoted at one end on the tube and connected with the bar, and means for holding the bar in adjusted position.

2. In a grain separator, the combination with the stacking tube, provided with a recess in its under side extending longitudinally of the tube, a pipe leading from the lower end of the tube to the separator, a plurality of screens arranged transversely of the recess one behind the other and separating the recess from the tube, each screen consisting of a plurality of sections, each section comprising a cross bar and a plurality of laterally extending fingers, the cross bars of the sections forming a screen being arranged in alinement transversely of the tube, a shaft journaled transversely of the recess below each pair of alined cross bars, an eyebolt connected with each cross bar, a pivotal connection between the eye of each eyebolt and the shaft, each of the said shafts having a central arm extending between the sections and having a crank arm outside of the tube, a link connecting each section with the central arm of the adjacent shaft, a lever pivoted at one end on the tube and connected with the bar, and means for holding the bar in adjusted position.

3. In a grain separator, the combination with the stacking tube provided with an enlargement forming a recess in its under side extending longitudinally of the tube, and a pipe leading from the recess to the body of the separator, of a plurality of screens arranged transversely of the tube between the recess and the tube and in alinement, each screen consisting of a plurality of sections, each section comprising a cross bar and laterally extending spaced fingers, the cross bars of the sections of each screen being in alinement, a shaft journaled transversely of the recess below each screen, a pivotal connection between each cross bar and the adjacent shaft, each shaft having a lateral arm between the sections, a link connecting an inner finger of each section with the arm, each shaft having a crank arm outside of the tube, a bar connecting the arms, means for moving the bar, and means for holding the bar in adjusted position.

4. In a grain separator, the combination with the stacking tube provided with an enlargement forming a recess in its under side extending longitudinally of the tube, and a pipe leading from the recess to the body of the separator, of a plurality of screens arranged transversely of the tube between the recess and the tube and in alinement, each screen consisting of a plurality of sections, each section comprising a cross bar and laterally extending spaced fingers, the cross bars of the sections of each screen being in alinement, a shaft journaled transversely of the recess below each screen, a pivotal connection between each cross bar and the adjacent shaft, each shaft having a lateral arm between the sections, a link connecting an inner finger of each section to the arm, and means for simultaneously oscillating the shafts.

5. In a grain separator, the combination with the stacking tube provided with an enlargement forming a recess in its under side extending longitudinally of the tube, and a pipe leading from the recess to the body of the separator, of a plurality of screens arranged transversely of the tube, between the recess and the tube and in alinement, each screen consisting of a plurality of sections, each section comprising a cross bar and laterally extending spaced fingers, the cross bars of the sections of each screen being in alinement, a shaft journaled transversely of the recess below each screen, a connection between each section and the adjacent shaft for swinging the section on the cross bar, means for simultaneously oscillating the shaft, and means for holding them in adjusted position.

6. In a grain separator, the combination with the stacking tube provided with an enlargement forming a recess in its under side extending longitudinally of the tube, and a pipe leading from the recess to the body of the separator, of a plurality of screens arranged transversely of the tube between the recess and the tube and in alinement, each screen consisting of a plurality of sections, each section comprising a cross bar and laterally extending spaced finger, the cross bars of the sections of each screen being in alinement, means for simultaneously swinging the sections of each screen on the cross bar to incline the fingers with respect to the longitudinal axis of the tube, and means for simultaneously operating all of the said means.

7. In a grain separator, the combination with the stacking tube provided with an enlargement forming a recess in its under side extending longitudinally of the tube, and a pipe leading from the recess to the body of the separator, of a plurality of screens arranged transversely of the tube between the recess and the tube and in alinement, each of the screens comprising a plurality of spaced fingers extending longitudinally of the tube, and means for simultaneously moving the said screens to incline the fingers with respect to the longitudinal axis of the tube.

8. In a grain separator, the combination with the stacking tube provided with an enlargement forming a recess in its under side extending longitudinally of the tube, and a pipe leading from the recess to the body of the separator, of a plurality of screens arranged transversely of the tube between the recess and the tube, and in alinement, and means for simultaneously moving the said screens to cause them to take an inclined position with respect to the longitudinal axis of the tube.

9. In a grain separator, the combination with the stacking tube provided with an enlargement forming a recess in its under side extending longitudinally of the tube, and a pipe leading from the recess to the body of the separator, of a plurality of screens arranged transversely of the tube between the recess and the tube, and means for moving each of the said screens to cause them to take an inclined position with respect to the longitudinal axis of the tube.

10. In a grain separator, the combination with the stacking tube, of a plurality of screens arranged along the bottom thereof transversely of the tube, each screen comprising a plurality of spaced fingers extending longitudinally of the tube, a cross bar connecting the fingers, and means for simultaneously moving the screens to incline the fingers with respect to the longitudinal axis of the tube.

ERICK P. BERGMAN.

Witnesses:
HAL CLARKE,
VIRGIL W. HILL.

Copies of this patent may be obtained for five cents each, by addressing the "Commissioner of Patents, Washington, D. C."